Oct. 6, 1931.  W. F. MESINGER  1,825,970
HYDRAULIC FLASH ARRESTER
Filed Oct. 4, 1927
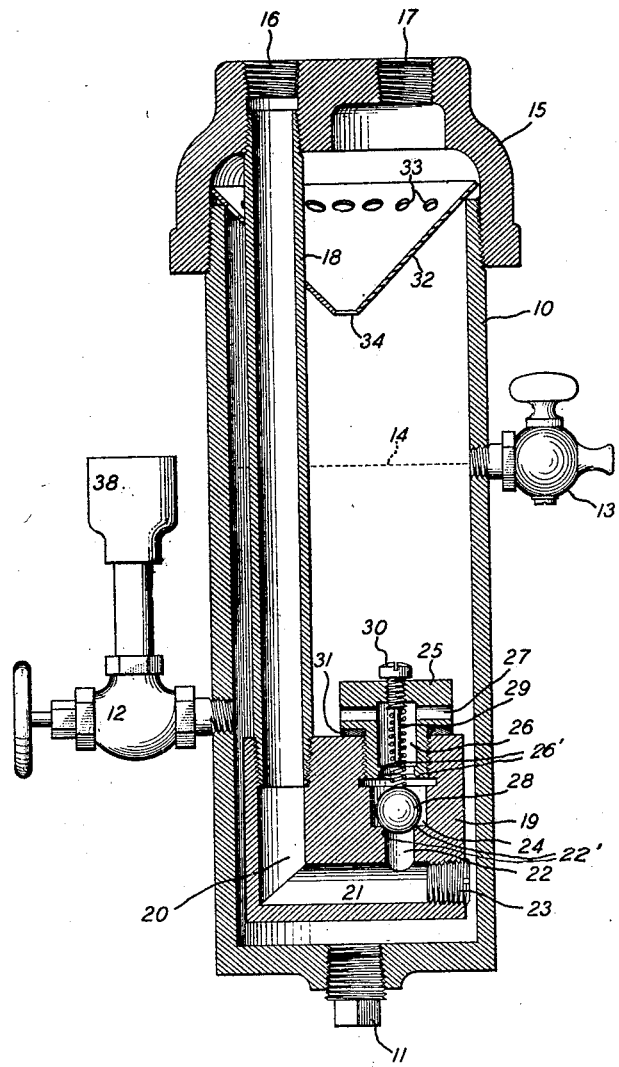
INVENTOR:
William F. Mesinger,
BY
ATTORNEYS.

Patented Oct. 6, 1931

1,825,970

UNITED STATES PATENT OFFICE

WILLIAM F. MESINGER, OF INDIANAPOLIS, INDIANA, ASSIGNOR TO PREST-O-LITE CO. INC., A CORPORATION OF NEW YORK

HYDRAULIC FLASH ARRESTER

Application filed October 4, 1927. Serial No. 224,018.

This invention relates to a hydraulic flash arrester of the type used to stop back flow or flash backs of combustible gases. While it is useful in connection with any type of apparatus, it is especially adapted for use in connection with systems for oxy-acetylene welding and cutting. While various pressures may be used, this device is primarily designed for use with relatively high pressures, as those in excess of 5 lbs. to the square inch.

In welding or cutting in which a combustible gas is used, means must be provided for preventing a flame from being propagated back from the torch to the generator, gas cylinder or other source of combustible gas. While various types of flash back arresters have been devised which rely upon the use of pervious members to prevent the propagation of the flame, these are not suitable for use in systems in which there is a possibility of oxygen being forced back into the supply of acetylene or other combustible gas. To prevent this various types of hydraulic flash arresters have been devised. These, however, have only been adapted for use with very low pressures usually less than twenty-five inches of water and are not adapted for pressures such as 5 lbs. to the square inch and higher.

An object of my invention is to provide a flash arrester which shall be less bulky than any hitherto used and at the same time be cheap, rugged and durable. Another object of my invention is to provide a flash arrester which shall act as a non-return valve in case a back pressure is developed. These and other objects of my invention will be evident from the following description having reference to the accompanying drawing in which the single figure is a vertical cross section of a device constructed in accordance with my invention.

In the embodiment shown in the drawing a cylinder 10 is closed at one end, a plug 11 being provided whereby the cylinder can be drained. A valve 12 is secured to one side of the cylinder 10 and serves as a water inlet. Another valve 13 is secured higher on the cylinder and serves as an overflow, maintaining the water level at 14. The cylinder 10 is provided with a cap 15, this cap being provided with screw-threaded holes 16 and 17 by means of which the device is attached to the gas line. A pipe 18 extends downwardly from the lower end of the hole 16, this pipe being screw threaded at its lower end to support a valve casing 19.

The valve casing 19 is provided with a hole 20 extending downwardly from the pipe 18. A hole 21 is provided extending horizontally from the hole 20 and a hole 22 is provided extending upwardly from the hole 21. The holes 20, 21 and 22 form a U-shaped passage in the valve casing, the end of the hole 21 being provided with a suitable closure, as a flush plug 23. The upper portion of the hole 22 is counter-sunk to form a valve chamber, there being a valve seat taper 22′ between the counter-sunk portion and the passage 22. The upper portion of the valve chamber is provided with screw threads to receive a member 25, this member being provided with a central opening 26 and radiating openings 27. A ball valve 28 rests on the valve seat 22′ and is held in position by a spring 29 which is maintained in the central opening 26 by an adjusting screw 30. A washer 31 serves to form a tight joint between the valve casing and the member 25. A conical baffle 32 is provided in the top of the cylinder 10, this baffle being provided with holes 33 near the top and a central hole 34 at the bottom.

The operation of the device is as follows:

The valves 12 and 13 are open and the cylinder is filled with water or other sealing liquid, which may contain suitable addition agents to lower the freezing point, until it overflows from the valve 13, when both valves are closed. The device is then connected to the gas line and gas is allowed to flow downwardly through the pipe 18 and through the holes 20, 21 and 22. The gas raises the valve 28 from its seat 22′ and the gas passes upwardly through the central passage 26 and the radial passages 27 and is then allowed to bubble through the sealing liquid from whence it passes out through the hole 17, the baffle 32 serving to prevent any liquid from being carried over by the gas. In case there is any back pressure in the line the water is forced downwardly in the cylinder seating the valve 28, and preventing the gas from flowing backward through the opening 16. In case of an explosion the flame is propagated rapidly along the line. If a check valve alone were used there would be danger that the flame would be propagated past the check valve before it closed. However, the sealing liquid serves to retard the explosion long enough to enable a check valve to operate.

In case it is desirable to prevent an explosion from being propagated along the direction of the normal flow of gas, the bottom part of the opening 26 is bevelled to form a valve seat. When this is done the normal gas pressure raises the valve 28 enough to permit a normal flow of gas. Should there be an explosion or other unusual increase in pressure in the side of the gas line connected to the opening 16, this pressure will force the valve 28 upwardly against the upper seat 26' and close the valve until the pressure is reduced.

While I have shown an overflow valve for regulating the sealing liquid level I may utilize a funnel 38 of such a height as to secure the same result.

I claim:

A flash back arrester for combustible gases comprising a chamber, a conduit extending downwardly from the top of said chamber, a valve body supported by said conduit and in communiction therewith, a valve member within said valve body, valve seats above and below said valve member, and a resilient member for holding said valve member against the lower seat, said chamber being provided with a filling means having an effective opening above the level of said liquid.

In testimony whereof, I affix my signature.

WILLIAM F. MESINGER.